United States Patent
Choi et al.

(10) Patent No.: US 10,014,545 B2
(45) Date of Patent: Jul. 3, 2018

(54) METHOD FOR OPERATING REDOX FLOW BATTERY

(71) Applicant: LOTTE CHEMICAL CORPORATION, Seoul (KR)

(72) Inventors: Eun-Mi Choi, Daejeon (KR); Dae-Sik Kim, Daejeon (KR); Mi-Kyoung Kim, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 96 days.

(21) Appl. No.: 15/034,283

(22) PCT Filed: Oct. 28, 2014

(86) PCT No.: PCT/KR2014/010194
§ 371 (c)(1),
(2) Date: May 4, 2016

(87) PCT Pub. No.: WO2015/068979
PCT Pub. Date: May 14, 2015

(65) Prior Publication Data
US 2016/0285123 A1 Sep. 29, 2016

(30) Foreign Application Priority Data
Nov. 5, 2013 (KR) ........................ 10-2013-0133722

(51) Int. Cl.
*H02J 7/00* (2006.01)
*H01M 8/18* (2006.01)
(Continued)

(52) U.S. Cl.
CPC ....... *H01M 8/188* (2013.01); *H01M 8/04313* (2013.01); *H01M 8/04865* (2013.01);
(Continued)

(58) Field of Classification Search
USPC ....................................................... 320/128
See application file for complete search history.

(56) References Cited

U.S. PATENT DOCUMENTS 8,277,964 B2    10/2012  Hennessy
2006/0183016 A1*  8/2006  Kazacos .............. B60L 11/1822
                                                          429/105
(Continued)

FOREIGN PATENT DOCUMENTS

CN    101562256    6/2011
CN    102324547    1/2012
(Continued)

OTHER PUBLICATIONS

EPO, Extended European Search Report, dated May 4, 2017, European Patent Application No. 14860138.8.
(Continued)

*Primary Examiner* — Samuel Berhanu
(74) *Attorney, Agent, or Firm* — Lex IP Meister, PLLC

(57) ABSTRACT

The present disclosure relate to a method for operating a redox flow battery, which includes the steps of discharging the redox flow battery having an anode electrolyte and a cathode electrolyte when a volume difference between the anode electrolyte and the cathode electrolyte is within 20% of a total volume of the anode electrolyte and the cathode electrolyte, while maintaining an open circuit voltage of lower than 1.3 V/cell, and moving the anode electrolyte and/or the cathode electrolyte so that the volume difference is 2% or less between the anode electrolyte and the cathode electrolyte in the redox flow battery after the discharging.

6 Claims, 2 Drawing Sheets

(51) Int. Cl.
*H01M 8/04313* (2016.01)
*H01M 8/04858* (2016.01)
*H01M 8/20* (2006.01)
*H01M 10/44* (2006.01)

(52) U.S. Cl.
CPC .............. *H01M 8/20* (2013.01); *H01M 10/44* (2013.01); *Y02E 60/528* (2013.01)

(56) References Cited

U.S. PATENT DOCUMENTS

| | | | |
|---|---|---|---|
| 2012/0077068 A1 | 3/2012 | Wang et al. | |
| 2014/0285153 A1* | 9/2014 | Fukunaga | H01M 10/399 320/127 |

FOREIGN PATENT DOCUMENTS

| | | |
|---|---|---|
| CN | 102354763 | 2/2012 |
| CN | 101800339 | 7/2012 |
| JP | 05-142313 | 6/1993 |
| JP | 2000-030721 | 1/2000 |
| JP | 3085634 | 9/2000 |
| JP | 2003-157883 | 5/2003 |
| JP | 2003-157884 | 5/2003 |
| JP | 2003-257467 | 9/2003 |
| JP | 2003-303611 | 10/2003 |
| JP | 2006-040648 | 2/2006 |
| JP | 2007-188729 | 7/2007 |
| JP | 2009-016216 | 1/2009 |
| JP | 2012-515438 | 7/2012 |
| KR | 10-2008-0077572 | 8/2008 |
| KR | 10-1016899 | 2/2011 |
| KR | 10-1161767 | 6/2012 |
| KR | 10-2013-0010414 | 1/2013 |
| KR | 10-2013-0110355 | 10/2013 |
| KR | 10-2014-0090216 | 7/2014 |
| WO | 01/76000 | 10/2001 |
| WO | 2013-165089 | 11/2013 |

OTHER PUBLICATIONS

PCT Search Report & Written Opinion, Patent Cooperation Treaty, dated Jan. 21, 2015, PCT/KR2014/010194.

* cited by examiner

[FIG. 1]
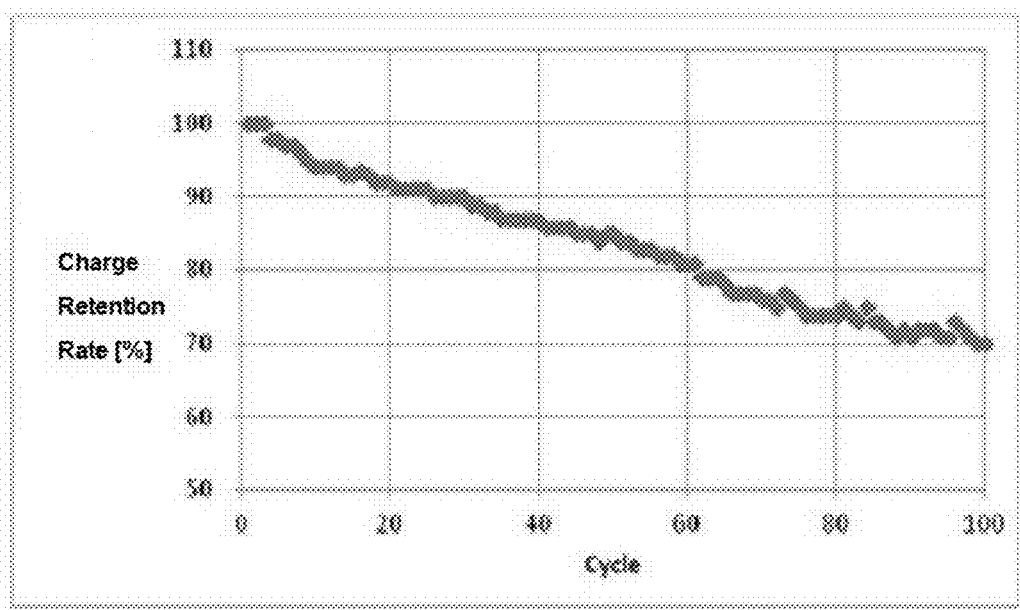

[FIG. 2]
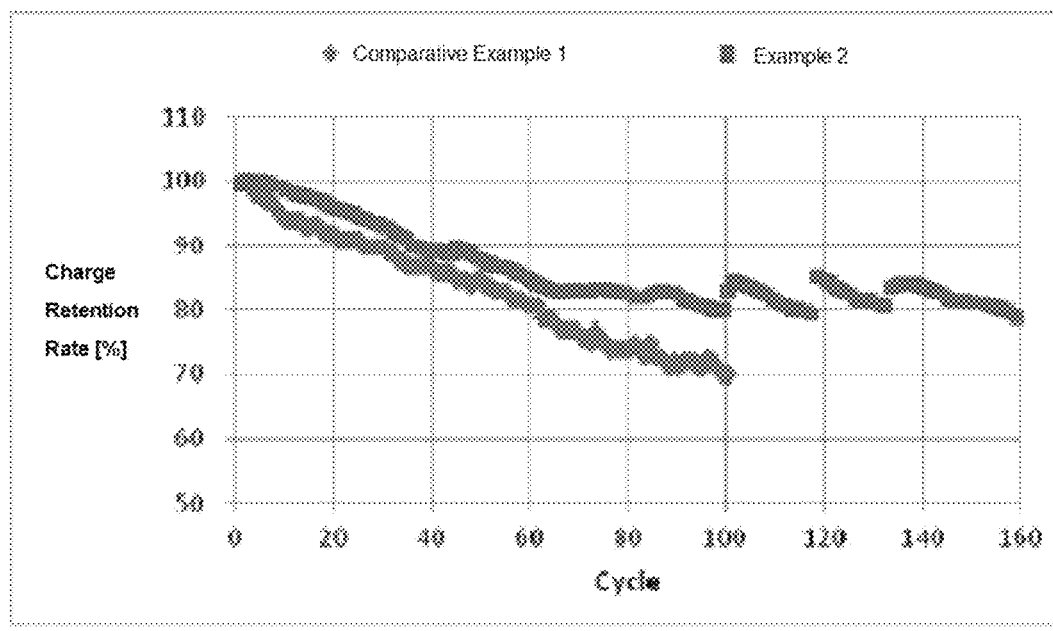

METHOD FOR OPERATING REDOX FLOW BATTERY

TECHNICAL FIELD

The present invention relates to a method for operating a redox flow battery. More particularly, the present invention relates to a method for operating a redox flow battery that can provide efficient and quick recovery of performance of the redox flow battery when the efficiency and capacity of the redox flow battery are decreased for various reasons including a crossover between water molecules and electrolytes, a self-discharge, and other side reactions.

BACKGROUND OF ART

Existing power generation systems have various inherent limitations, for example, thermal power generation emits a large amount of greenhouse gases and environmental pollution by using fossil fuels, and nuclear power plants have stability issues and the need for hazardous waste processing. In response thereto, research efforts to develop environmentally friendlier, higher efficiency energy sources, and a power supply system using the same, have increased significantly.

In particular, power storage technology has been the focus of research and development activities for broadening the usability of renewable energy sources with respect to their significant susceptibility to external conditions and for enhancing efficiency of power utilization, wherein secondary batteries receive more intensive interest and research and development efforts thereof are being actively undertaken.

A redox flow battery is an oxidation/reduction cell capable of converting chemical energy of an active substance directly into electrical energy, and it represents an energy storage system adapted to store new and renewable energy with substantial output variations according to environmental conditions such as sunlight and wind, and to convert the same into high-quality power.

Specifically, the redox flow battery has electrolytes containing an active material that causes an oxidation/reduction reaction, and circulating between opposite electrodes and a storage tank, to perform charging and discharging.

Such a redox flow battery typically includes tanks containing active materials in different oxidized states, a pump for circulating the active materials during charge/discharge, and unit cells partitioned by a separation membrane, wherein the unit cell includes electrodes, an electrolyte, a current collector, and a separation membrane.

The electrolyte includes an active material that undergoes the oxidation/reduction process for enabling the charge/discharge operation, serving as an important factor to determine the battery capacity.

For example, a vanadium flow battery has an electrolytic solution composed of four ions with different oxidation numbers. During the process of charging and discharging, a hydrogen ion accompanied by water or vanadium ions may permeate the separation membrane, which is an ion crossover phenomenon, to generate a self-discharge. When this phenomenon occurs, different moving speeds of respective ions cause a density difference and a volume difference between opposite electrodes. Then, the ill-balanced opposite electrolytic solutions lead to a reduced absolute amount of redox coupling, and degradation of battery performance and a charge retention rate.

DETAILED DESCRIPTION OF THE INVENTION

Technical Problem

Therefore, some embodiments of the present invention seek to provide a method for operating a redox flow battery that can provide efficient quick recovery of performance of the redox flow battery when the efficiency and capacity of the redox flow battery are decreased for various reasons including a crossover between water molecules and electrolytes, a self-discharge, and other side reactions.

Technical Solution

Some embodiments of the present invention provide a method for operating a redox flow battery which includes the steps of discharging the redox flow battery having an anode electrolyte and a cathode electrolyte when a volume difference between the anode electrolyte and the cathode electrolyte is within 20% of a total volume of the anode electrolyte and the cathode electrolyte, while maintaining an open circuit voltage of lower than 1.3 V/cell, and moving the anode electrolyte and/or the cathode electrolyte so that the volume difference is 2% or less between the anode electrolyte and the cathode electrolyte in the redox flow battery after the discharging.

Hereinafter, in accordance with some specific embodiments of the present disclosure, the operating method of the redox flow battery will be described in more detail.

A liquid level difference between the opposite electrolyte containers due to a crossover having occurred between ions and water molecules contained in the electrolyte breaks the balances of volumes and densities between the opposite electrolytic solutions to degrade the battery performance.

Specifically, operating the redox flow battery may involve a gradually increasing volume difference between an anode electrolyte and a cathode electrolyte for some reasons including a crossover between water molecules and the electrolytes, self-discharge, and other side reactions, resulting in ill-balanced volumes and densities between the opposite electrolytic solutions and thus degrading the battery performance.

To solve these deficiencies, the present inventors investigated a method for operating the redox flow battery or a method for recovering the performance of the redox flow battery, and found through experiments that efficient quick recovery of the performance of the redox flow battery can be provided by discharging the redox flow battery when a crossover amount of the electrolyte is within 20% of the total volume of the anode electrolyte and the cathode electrolyte, while maintaining an open circuit voltage of lower than 1.3 V/cell, and moving the anode electrolyte and/or the cathode electrolyte over to opposite electrolyte containers respectively by the crossover amount of the electrolyte, so that the anode electrolyte and the cathode electrolyte are leveled off. The present invention was completed on the basis of such a finding.

The time to discharge the redox flow battery may be when the volume difference between the anode electrolyte and the cathode electrolyte is within 20% of a total volume of the anode electrolyte and the cathode electrolyte, or it may be when the volume difference is 10 to 20% of the total volume of the anode electrolyte and the cathode electrolyte.

The volume difference between the anode and the cathode electrolytes exceeding 20% of their total volume causes the corresponding amount of electrolyte movement to raise the charge capacity, which causes more time to be needed for the recovery of the battery performance, and an exothermic reaction is generated due to electrolyte movement, thus exceeding a set limit of operating temperatures of the battery.

The discharging may include overdischarging the redox flow battery under conditions of a constant current or a constant voltage.

More specifically, overdischarging the redox flow battery is carried out under conditions of a constant current or a constant voltage at a lower level than charge and discharge conditions until an open circuit voltage drops lower than 1.2 V/cell. Preferably, overdischarging may be carried out until the open circuit voltage becomes appropriately 0.6 to 0.8 V/cell.

Thus, the discharging of the redox flow battery until the open circuit voltage becomes 0.6 to 0.8 V/cell may precede the moving of the anode electrolyte and/or the cathode electrolyte so that the volume difference is 2% or less.

The movement of the electrolyte may be performed upon completion of the discharging of the redox flow battery. The movement of the electrolyte may be performed by means of, for example, a micropipette or by using an apparatus with an anode electrolyte tank and a cathode electrolyte tank connected via a valve.

After the step of discharging the redox flow battery, one of the anode electrolyte and the cathode electrolyte, which has a larger volume, may be moved to the other having a smaller volume so that the anode electrolyte and the cathode electrolyte have substantially equal volumes, for example, the volume difference of 2% or less therebetween.

The redox flow battery may be a vanadium redox battery, a polysulfide bromide redox flow battery, or a zinc-bromine redox flow battery.

The redox flow battery may utilize, in a redox couple, all vanadium (V/V), V, Br, Zn/Br, Zn/Ce, and the like.

Some embodiments may further include charging the redox flow battery after the moving of the anode electrolyte and/or the cathode electrolyte. In other words, the method for operating the redox flow battery may include discharging the redox flow battery when the volume difference between the anode electrolyte and the cathode electrolyte is within 20% of a total volume of the anode electrolyte and the cathode electrolyte, while maintaining a specified open circuit voltage, moving the anode electrolyte and/or the cathode electrolyte, and then recharging the redox flow battery, to proceed with repeated cycles or operations.

Advantageous Effects

According to the present invention, a method for operating a redox flow battery provides efficient quick recovery of the performance of the redox flow battery when the efficiency and capacity of the redox flow battery are decreased for various reasons including a crossover between water molecules and electrolytes, a self-discharge, and other side reactions.

BRIEF DESCRIPTION OF THE DRAWINGS

FIG. 1 is a graph showing charge retention rates of a redox flow battery of Comparative Example 1 with respect to a charging and discharging cycle.

FIG. 2 is a graph showing charge retention rates of redox flow batteries of Example 1 and Comparative Example 1, when respectively operated in a charging and discharging cycle.

DETAILED DESCRIPTION OF THE EMBODIMENTS

Below, the present invention will be described in more detail by way of examples. However, these examples are provided only for illustration of the present invention, and should not be construed as limiting the scope of the present invention to these examples.

Examples and Comparative Examples: Operation of a Redox Flow Battery

The examples and comparative examples below utilize redox flow batteries for comparison by different operating methods, which are made to have a cathode and an anode positioned on the left and right about a separation membrane with a current collector and an electrolyte inlet and outlet on the top and bottom, respectively.

For a vanadium electrolytic solution, the redox flow battery uses a 2 M vanadium solution dissolved in aqueous sulfuric acid. In addition, a charging completion voltage was 1.60 V/cell, and a discharge completion voltage was set to 1.0 V/cell. Further, the charge retention rate was measured based on the discharge capacity retention rate compared to the initial value at each cycle.

Table 1 below details the respective constituents of the manufactured redox flow battery.

TABLE 1

| Item | | |
|---|---|---|
| Electrode | Maker (Product Name) | SGL (GFD 3) |
| | Thickness (mm) | 3 |
| Separation Membrane | Maker (Product Name) | GEFC (104) |
| | Thickness (μm) | 100 |
| Bipolar Plate | Maker (Product Name) | Morgan |
| | Thickness (mm) | 3 |

Example 1

The amount of electrolyte movement is equal to or less than 10% of the total volume of the electrolytes with an open circuit voltage after the discharging is maintained at lower than 1.3 V/cell, and the experimental results are shown in Table 2. A, B and C, D respectively represent data of two cycles immediately before and after moving the electrolytic solution, where C is the duration of moving the electrolytic solution by the volume difference between the electrolytes due to crossover.

TABLE 2

| Classification | Charge Capacity (Ah/cell) | Discharge Capacity (Ah/cell) | EE (%) | CE (%) | VE (%) | Charge Retention Rate (%) | Post-charge Open Circuit Voltage (V/cell) | Post-discharge Open Circuit Voltage (V/cell) |
|---|---|---|---|---|---|---|---|---|
| A | 3.23 | 3.10 | 84 | 96 | 87 | 82 | 1.51 | 1.24 |
| B | 3.22 | 3.08 | 84 | 96 | 87 | 81 | 1.51 | 1.23 |
| C | | | | | | | | |
| D | 3.96 | 3.78 | 84 | 95 | 88 | 100 | 1.52 | 1.23 |
| E | 3.88 | 3.72 | 84 | 96 | 88 | 98 | 1.51 | 1.24 |

Example 2

The amount of electrolyte movement is greater than 10% and less than 15% of the total volume of the electrolytes with an open circuit voltage after the discharging is maintained at lower than 1.3 V/cell, and the experimental results are shown in Table 3 below.

TABLE 3

| Classification | Charge Capacity (Ah/cell) | Discharge Capacity (Ah/cell) | EE (%) | CE (%) | VE (%) | Charge Retention Rate (%) | Post-charge Open Circuit Voltage (V/cell) | Post-discharge Open Circuit Voltage (V/cell) |
|---|---|---|---|---|---|---|---|---|
| A | 3.83 | 3.62 | 84 | 94 | 89 | 85 | 1.51 | 1.20 |
| B | 3.84 | 3.63 | 84 | 95 | 89 | 98 | 1.51 | 1.19 |
| C | | | | | | | | |
| D | 4.10 | 3.87 | 85 | 95 | 90 | 100 | 1.53 | 1.24 |
| E | 4.10 | 3.88 | 85 | 95 | 90 | 100 | 1.53 | 1.24 |

With the open circuit voltage after the discharging is maintained at lower than 1.3 V/cell and the amount of electrolyte movement is 10% or less or is greater than 10% and less than 15% of the total volume of the electrolytes, the efficiency is maintained, and the charge retention rate rises as identified above.

Example 3

The amount of electrolyte movement is greater than 15% and less than 20% of the total volume of the electrolytes with an open circuit voltage after the discharging is maintained at lower than 1.3 V/cell, and the experimental results are shown in Table 4 below.

TABLE 4

| Classification | Charge Capacity (Ah/cell) | Discharge Capacity (Ah/cell) | EE (%) | CE (%) | VE (%) | Charge Retention Rate (%) | Post-charge Open Circuit Voltage (V/cell) | Post-discharge Open Circuit Voltage (V/cell) |
|---|---|---|---|---|---|---|---|---|
| A | 3.94 | 3.64 | 81 | 92 | 88 | 82 | 1.51 | 1.22 |
| B | 3.89 | 3.60 | 81 | 92 | 88 | 81 | 1.51 | 1.23 |
| C | | | | | | | | |
| D | 4.03 | 3.78 | 82 | 94 | 88 | 96 | 1.51 | 1.24 |
| E | 4.05 | 3.80 | 82 | 94 | 88 | 96 | 1.51 | 1.24 |

Comparative Example 1

The redox flow battery is operated in the same manner as in Example 1, with the exception that the charge and discharge cycle was performed without a movement of electrolyte. FIG. 1 graphically shows charge retention rates of the redox flow battery of Comparative Example 1 with respect to a charging and discharging cycle.

Comparative Example 2

The redox flow battery was operated in the same manner as in Example 1, with the exception that the amount of electrolyte movement was equal to or less than 10% of the total volume of the electrolytes with an open circuit voltage after the discharging was maintained at higher than 1.3 V/cell, and the experimental results are shown in Table 5 below.

TABLE 5

| Classification | Charge Capacity (Ah/cell) | Discharge Capacity (Ah/cell) | EE (%) | CE (%) | VE (%) | Charge Retention Rate (%) | Post-charge Open Circuit Voltage (V/cell) | Post-discharge Open Circuit Voltage (V/cell) |
|---|---|---|---|---|---|---|---|---|
|   | 2.13 | 1.80 | 74 | 85 | 87 | 50 | 1.50 | 1.32 |
| B | 1.99 | 1.68 | 74 | 85 | 87 | 47 | 1.50 | 1.33 |
| C |   |   |   |   |   |   |   |   |
| D | 0.90 | 0.85 | 81 | 94 | 86 | 24 | 1.49 | 1.35 |
| E | 0.92 | 0.86 | 81 | 94 | 86 | 24 | 1.49 | 1.35 |

Comparative Example 3

The redox flow battery was operated in the same manner as in Example 1, with the exception that the amount of electrolyte movement was greater than 10% and less than 15% of the total volume of the electrolytes with an open circuit voltage after the discharging was maintained at higher than 1.3 V/cell, and the experimental results are shown in Table 6 below.

TABLE 6

| Classification | Charge Capacity (Ah/cell) | Discharge Capacity (Ah/cell) | EE (%) | CE (%) | VE (%) | Charge Retention Rate (%) | Post-charge Open Circuit Voltage (V/cell) | Post-discharge Open Circuit Voltage (V/cell) |
|---|---|---|---|---|---|---|---|---|
|   | 3.10 | 2.61 | 76 | 82 | 93 | 79 | 1.51 | 1.30 |
| B | 2.75 | 2.33 | 77 | 82 | 94 | 79 | 1.51 | 1.30 |
| C |   |   |   |   |   |   |   |   |
| D | 2.45 | 1.91 | 80 | 93 | 86 | 77 | 1.52 | 1.31 |
| E | 2.40 | 1.87 | 81 | 93 | 87 | 77 | 1.52 | 1.31 |

Comparative Example 4

The redox flow battery was operated in the same manner as in Example 1, with the exception that the amount of electrolyte movement was greater than 15% and less than 20% of the total volume of the electrolytes with an open circuit voltage after the discharging was maintained at higher than 1.3 V/cell, and the experimental results are shown in Table 7 below.

TABLE 7

| Classification | Charge Capacity (Ah/cell) | Discharge Capacity (Ah/cell) | EE (%) | CE (%) | VE (%) | Charge Retention Rate (%) | Post-charge Open Circuit Voltage (V/cell) | Post-discharge Open Circuit Voltage (V/cell) |
|---|---|---|---|---|---|---|---|---|
|   | 2.61 | 2.49 | 79 | 94 | 84 | 69 | 1.48 | 1.30 |
| B | 2.55 | 2.40 | 79 | 94 | 84 | 69 | 1.48 | 1.30 |
| C |   |   |   |   |   |   |   |   |
| D | 1.78 | 1.70 | 79 | 95 | 83 | 47 | 1.48 | 1.32 |
| E | 1.75 | 1.68 | 79 | 95 | 83 | 47 | 1.48 | 1.32 |

When an open circuit voltage after the discharging is maintained at higher than 1.3 V/cell, irrespective of the percentage of electrolyte movement of the total volume of the electrolytes, there was no effect of increasing the charge capacity by the movement of the electrolytic solution. The efficiency saw a temporary rise when the charge retention rate declined, resulting in an increased open circuit voltage after the discharging.

Test Example 1

Using the conditions obtained in Example 2, a long-term battery test was conducted. The results thus obtained are shown in FIG. 2.

As shown in FIG. 2, the redox flow battery of Example 2, even after a long-term test, exhibited a charge retention rate that was maintained at more than 80% compared to the initial value, and can prevent the performance of the battery from being degraded.

The invention claimed is:

1. A method for operating a redox flow battery, the method comprising the steps of:
    discharging the redox flow battery having an anode electrolyte and a cathode electrolyte when a volume difference between the anode electrolyte and the cathode electrolyte is 10 to 20% of a total volume of the anode electrolyte and the cathode electrolyte, while maintaining an open circuit voltage of lower than 1.3 V/cell; and
    moving the anode electrolyte and/or the cathode electrolyte so that the volume difference is 2% or less between the anode electrolyte and the cathode electrolyte in the redox flow battery after the discharging.

2. The method for operating a redox flow battery according to claim 1, further comprising charging the redox flow battery after the moving of the anode electrolyte and/or the cathode electrolyte.

3. The method for operating a redox flow battery according to claim 1, wherein the discharging comprises overdischarging the redox flow battery under conditions of a constant current or a constant voltage.

4. The method for operating a redox flow battery according to claim 1, wherein the discharging comprises discharging the redox flow battery until the open circuit voltage becomes 0.6 to 0.8 V/cell.

5. The method for operating a redox flow battery according to claim 1, wherein the discharging of the redox flow battery until the open circuit voltage becomes 0.6 to 0.8 V/cell precedes the moving of the anode electrolyte and/or the cathode electrolyte so that the volume difference is 2% or less.

6. The method for operating a redox flow battery according to claim 1, wherein the redox flow battery is a vanadium redox battery, a polysulfide bromide redox flow battery, or a zinc-bromine redox flow battery.

\* \* \* \* \*